United States Patent
Kang et al.

(10) Patent No.: US 7,140,384 B2
(45) Date of Patent: Nov. 28, 2006

(54) SUBSTRATE PROCESSING EQUIPMENT HAVING MASS FLOW CONTROLLER

(75) Inventors: Sung-Ho Kang, Osan-si (KR); Seog-Min Lee, Suwon-si (KR); Sung-Wook Jung, Suwon-si (KR); Yong-Suk Kim, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 10/869,968

(22) Filed: Jun. 18, 2004

(65) Prior Publication Data

US 2004/0261705 A1 Dec. 30, 2004

(30) Foreign Application Priority Data

Jun. 27, 2003 (KR) .................. 10-2003-0042843

(51) Int. Cl.
*G05D 7/06* (2006.01)
(52) U.S. Cl. .............. 137/487.5; 137/486; 137/599.07; 137/599.14; 137/614.21; 118/715
(58) Field of Classification Search ............. 137/486, 137/487.5, 599.06, 599.07, 599.14, 614.21
See application file for complete search history.

(56) References Cited

U.S. PATENT DOCUMENTS 5,421,365 A * 6/1995 Matsuo et al. ......... 137/599.14
6,062,246 A * 5/2000 Tanaka et al. ................ 137/12
6,817,381 B1 * 11/2004 Otsuki et al. ............... 137/884
6,903,030 B1 * 6/2005 Ishii et al. ................... 438/782
2003/0124049 A1 * 7/2003 Krishnan et al. ......... 423/580.1

FOREIGN PATENT DOCUMENTS

KR 6-53103 2/1994
KR 1998-0011819 4/1998

* cited by examiner

*Primary Examiner*—Ramesh Krishnamurthy
(74) *Attorney, Agent, or Firm*—Volentine Francos & Whitt, PLLC

(57) ABSTRACT

A mass flow controller includes a base having a first passage, an inlet portion for introducing fluid into the first passage, an outlet portion for releasing the fluid from the first passage, and a second passage branched from a first upstream portion of the first passage and connected to a second downstream portion of the first passage A mass flow sensor is connected to the first passage between the inlet portion of the base and the first portion of the first passage; A first valve is disposed in-line with the first passage between the first and second portions. The first valve controls the mass flow of the fluid passing through the first passage;. A second valve is disposed in-line with the second passage to opens/close the second passage. A valve controller compares the mass flow measured by the mass flow sensor to a standard flow, and then positions the first valve such that the measured mass flow corresponds to the standard flow.

4 Claims, 8 Drawing Sheets

US 7,140,384 B2

SUBSTRATE PROCESSING EQUIPMENT HAVING MASS FLOW CONTROLLER

CROSS REFERENCE TO RELATED APPLICATION

This application claims priority under 35 U.S.C. § 119 to Korean Patent Application No 2003-42843, filed on Jun. 27, 2003, which is incorporated herein by reference in its entirety.

BACKGROUND OF THE INVENTION

1. Field of the Invention

The present invention relates to semiconductor device fabricating equipment that employs gas to process semiconductor substrates and the like. More particularly, the present invention relates to a mass flow controller of a gas supplying apparatus of semiconductor device fabricating equipment.

2. Description of the Related Art

Generally, various kinds of gases are used in semiconductor fabricating processes. A mass flow controller measures and controls the mass flows of the gases. Requirements for the accuracy of mass flow controllers have increased to meet the increasing demand for more highly integrated semiconductor devices.

FIG. 1 is a sectional view of a conventional mass flow controller, and FIG. 2 is a is an enlarged view of a mass flow sensor of the conventional mass flow controller.

Referring to FIGS. 1 and 2, a base 110 of the conventional mass flow controller 100 has a passage 112 through which a fluid passes, an inlet portion 114 for introducing the fluid into the passage 112, an outlet portion 116 for releasing the fluid from the passage 112.

A bypass 120 is disposed in the passage 112. The conventional mass flow controller 100 also has a sampling pipe 132 connected to the passage 112 between an inlet of the bypass 120 and an outlet of the bypass 120. Accordingly, a sample of the fluid flowing through the base 110 passes through the sampling pipe 132.

A mass flow sensor 130 measures a mass flow of the fluid passing through the sampling pipe 132 and hence, through the passage 112. The mass flow sensor 130 includes a first thermal resistance 134a and a second thermal resistance 134b wound around the sampling pipe 132. The first thermal resistance 134a and the second thermal resistance 134b include platinum (Pt) or other similar metals are connected to a bridge circuit 136. A control valve 140, e.g., a solenoid valve, is connected between the bypass 120 and the outlet end 116.

When the first thermal resistance 134a and the second thermal resistance 134b are heated, a temperature difference proportional to the mass flow of the fluid is generated between upstream and downstream ends of the sampling pipe 132. As a result, resistance values of the first thermal resistance 134a and the second thermal resistance 134b become different. The bridge circuit 136 detects the different resistance values as an electric signal. The detected signal is amplified through an amplifier (not shown). A compensator correlates the amplified signal to the mass flow of the fluid.

The measured signal indicating the mass flow of the fluid is transmitted to a valve controller (not shown). The valve controller compares the measured signal to a standard signal corresponding to a predetermined desired flow of the fluid. The valve controller moves the control valve 140 until the measured signal corresponds to the standard signal.

As mentioned above, this type of mass flow controller is widely used in apparatus for fabricating a semiconductor device. For example, the mass flow controller is used for controlling the supplying of a reaction gas in equipment in which a deposition process or an etching process is performed on a substrate.

When the mass flow controller malfunctions during the process, a main controller of the substrate processing equipment suspends the process. In particular, the main controller closes a plurality of valves mounted on a gas line through which the reacting gas passes. The substrate is unloaded from the substrate processing equipment. The reacting gas remaining in the gas line and the mass flow controller is then exhausted. Then, the mass flow controller is exchanged.

Accordingly, a gas supplying apparatus connected to the substrate processing equipment includes a purge line and a purge valve for exhausting the reacting gas that remains in the gas line and the mass flow controller. The purge line and the purge valve are connected to an inlet portion of the mass flow controller.

In addition, the control valve 140 of the mass flow controller is held open by current supplied to the control valve. On the contrary, the control valve 140 closes when the current is not supplied to the control valve. Thus, when the main controller cuts off the current to the control valve 140, the control valve 140 blocks the passage 112 in the base 10. Also, when the control valve 140 is experiencing trouble, the reacting gas remaining in the gas line and the mass flow controller is exhausted through only the purge line and the purge valve. However, the purge line and the purge valve contribute significantly to the volume and cost of the gas supplying apparatus

SUMMARY OF THE INVENTION

An object of the present invention is to provide a mass flow controller having a purge passage and a purge valve for exhausting gas that remains when the control valve of the mass flow controller is closed as the result of an abnormal operation of the mass flow controller.

According to one aspect of the present invention, a mass flow controller includes a base, a mass flow sensor, a first (control) valve, a second (purge) valve, and a valve controller. The base includes a first passage through which a fluid passes, an inlet portion for introducing the fluid into the first passage, an outlet portion for releasing the fluid from the first passage, and a second passage branched from a first upstream portion of the first passage and connected to a second downstream portion of the first passage. The mass flow sensor is connected to the first passage between the inlet portion of the base and the first portion of the first passage. The first valve is disposed in-line with the first passage between the first and second portions of the first passage. The first valve controls the mass flow of the fluid passing through the first passage. The second valve is disposed in-line with the second passage, and selectively opens and closes the second passage. The valve controller compares the mass flow measured by the mass flow sensor to a standard flow, and then controls the first valve so that the mass flow of the fluid flowing through the first passage corresponds to the standard flow.

The valve controller may be an integrated controller for the first and second control valves or a discrete controller may be provide for respectively controlling the operation of the first valve and the second valve.

The second valve is closed while the first valve is opened, or vise versa.

When the mass flow sensor generates an abnormal signal, the valve controller closes the first valve, and then takes steps to purge the fluid remaining in the first passage.

Alternatively, when the first valve is closed due to some error in the operation of the first valve, the valve controller opens the second valve to exhaust the fluid remaining in the first passage. Furthermore, the valve controller may be operative to open the first valve or the second valve when the first valve is closed due to an abnormal operation of the mass flow sensor.

According to another aspect of the present invention, the mass flow controller is employed by a gas supplying apparatus of substrate processing equipment. A gas line connects a source of processing gas to a processing chambers in which a substrate is disposed. The mass flow controller is disposed in the gas line. The inlet portion of the base of the mass flow controller is connected to the gas line so that gas is introduced to the first passage from the gas line through the inlet portion. The outlet portion of the base is connected to the gas line so that gas flowing through the first passage can be released back to the gas line.

The gas supplying apparatus further includes a main controller for controlling the flow of gas to the mass flow controller. When the first valve is operating abnormally, the main controller can generate a signal that opens the second valve. Likewise, when the first valve is closed due to a malfunction of the valve controller of the mass flow controller or due to a defect in the first valve, the gas remaining in the gas line and the first passage may be exhausted through the second passage and the second valve.

DETAILED DESCRIPTION OF PREFFERED EMBODIMENTS

Hereinafter, the present invention will be explained in detail with reference to the accompanying drawings.

Figure 1:
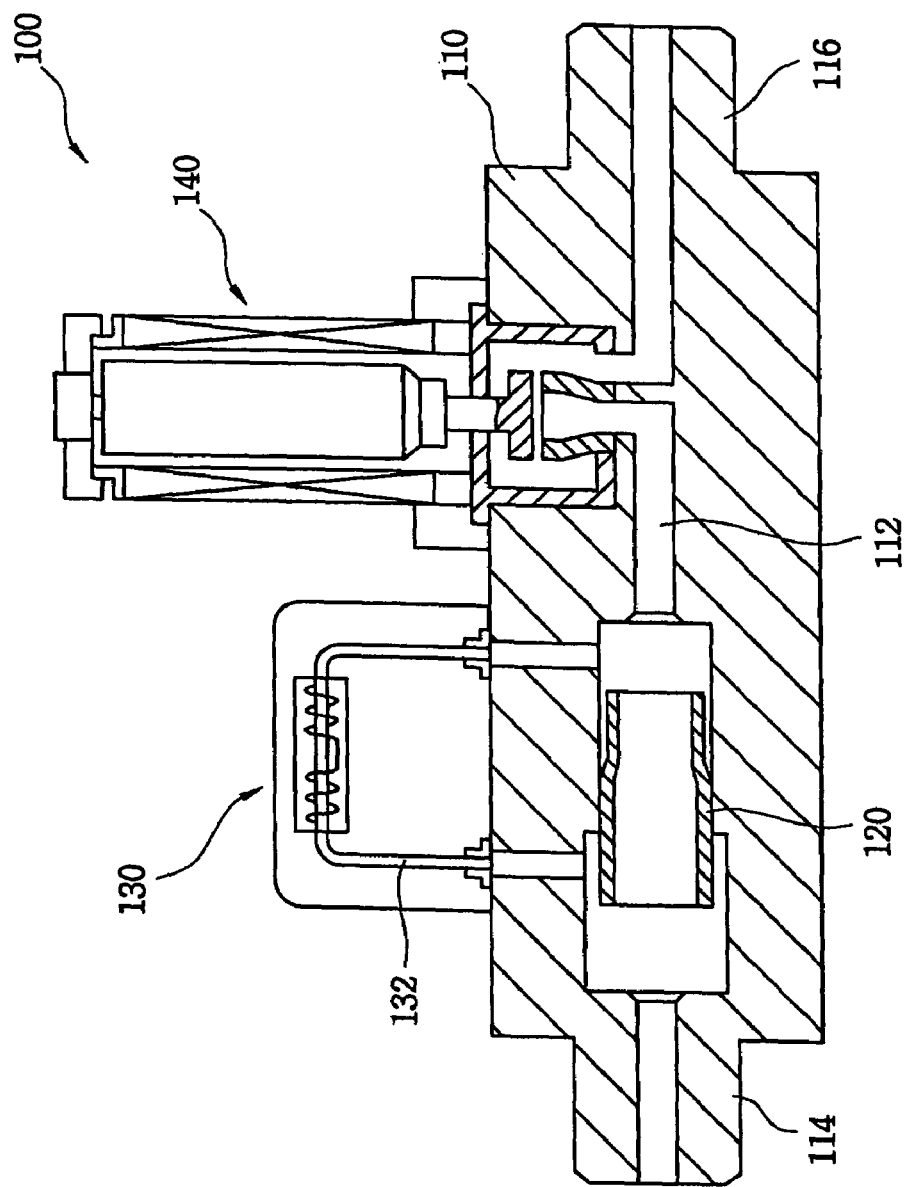
FIG. 1 is a sectional view of a conventional mass flow controller.
Figure 2:
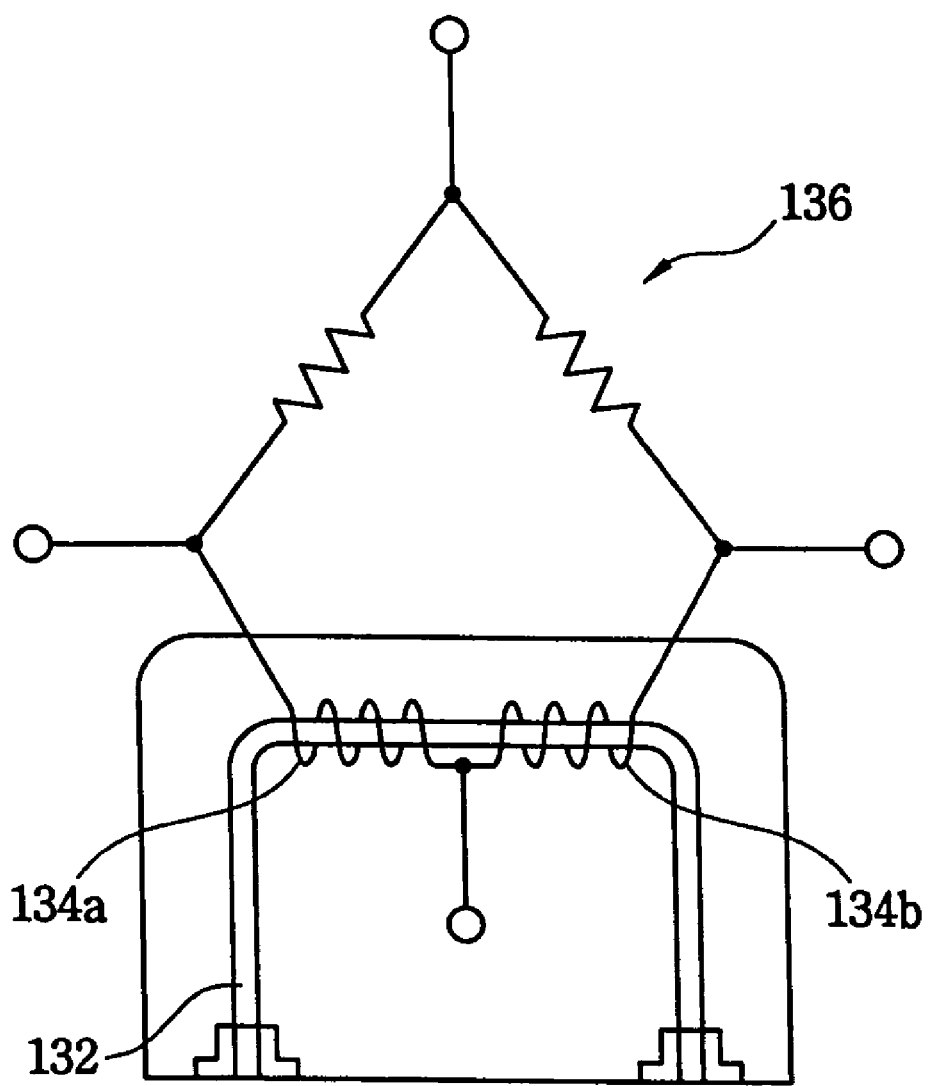
FIG. 2 is an enlarged view of a mass flow sensor of the conventional mass flow controller of FIG. 1.
Figure 3:
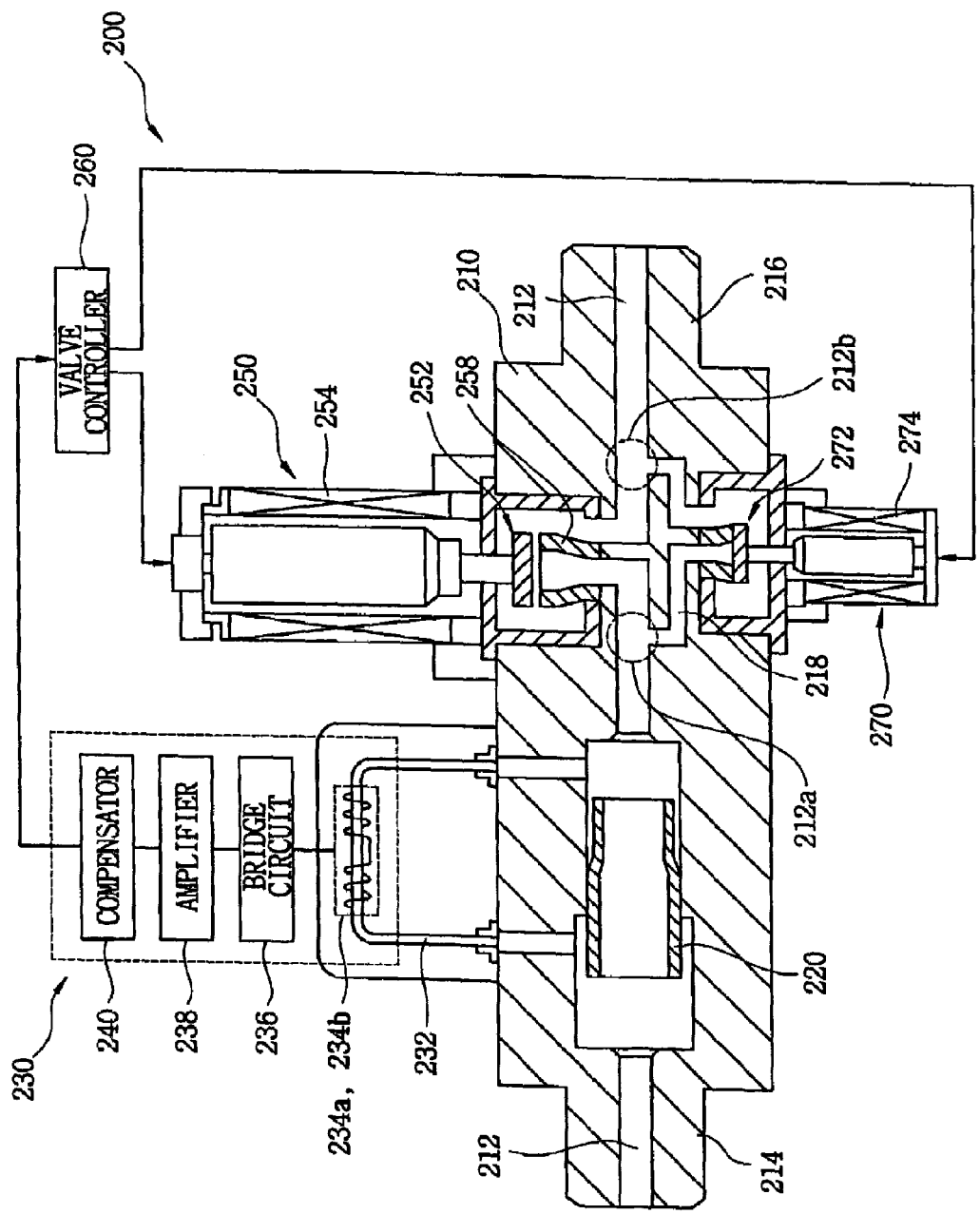
FIG. 3 is a schematic sectional view of a mass flow controller in accordance with the present invention.
Figure 4:
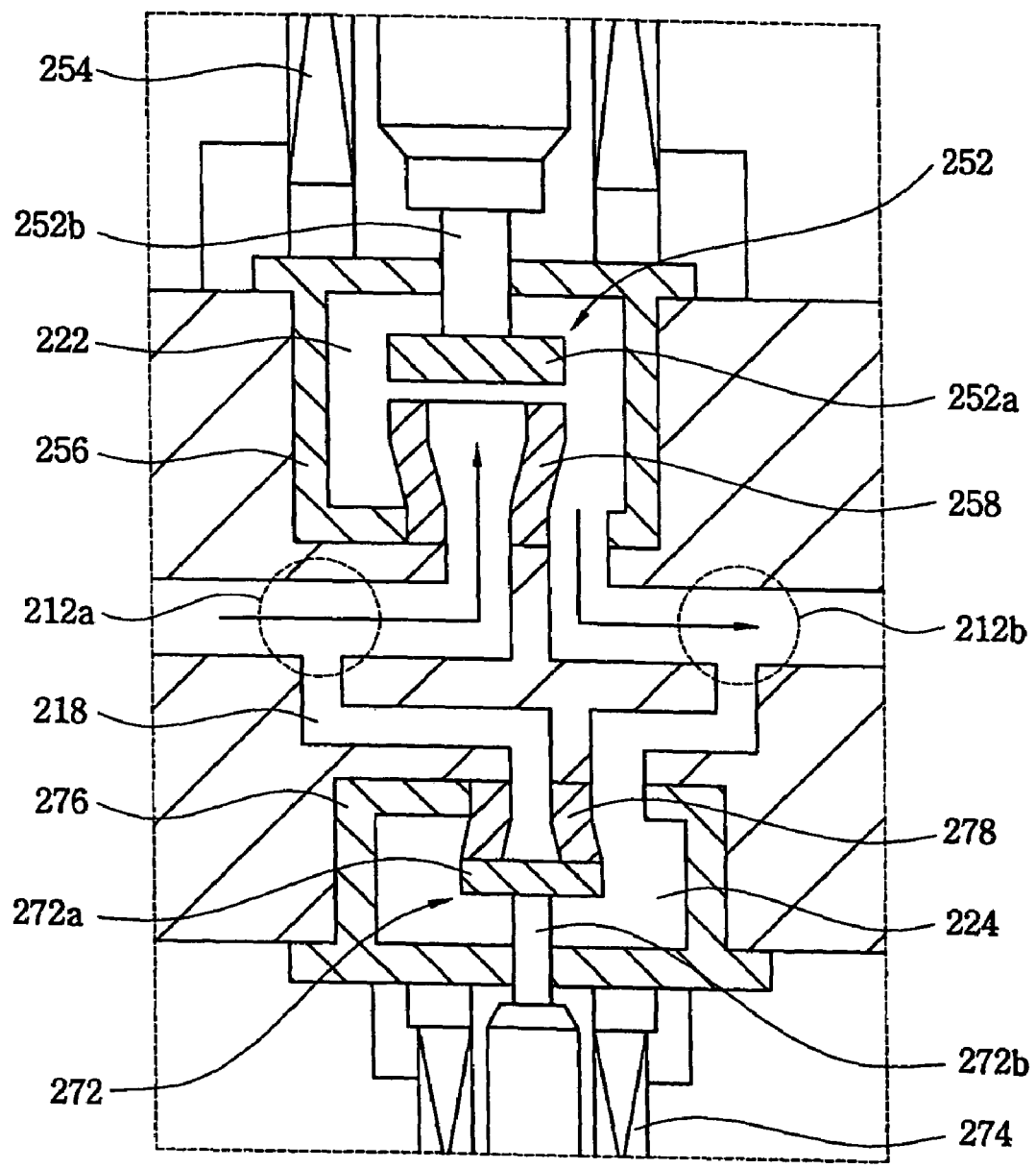
FIG. 4 is an enlarged view of respective portions of first and second valves of mass flow controller of the present invention.

Referring first to FIGS. 3 and 4, a mass flow controller 200 according to the present invention is connected to a pipe (not shown) through which fluid is supplied. For example, the mass flow controller 200 is connected to a pipe for supplying processing gas to semiconductor fabricating equipment, wherein the mass flow controller 200 controls the mass flow of the gas. The mass flow controller 200 includes a base 210, a mass flow sensor 230, a first valve 250, a valve controller 260 and a second valve 270. In this embodiment, the first valve 250 may be used as a control valve, and the second valve 270 may be used as a purge valve.

The base 210 has a first passage 212 through which the fluid passes, an inlet portion 214 for introducing the fluid into the first passage 212 from the fluid supply pipe and an outlet portion 216 for releasing the fluid from the first passage 212 back to the fluid supply pipe. The base 210 further includes a second passage 218 branched from a first upstream portion 212a of the first passage 212. The second passage 218 is connected to a second downstream portion 212b of the first passage 212.

The mass flow sensor 230 is connected to the first passage 212, at a location between the inlet portion 214 and the first portion 212a thereof, to, thereby measure the mass flow of the fluid passing through the first passage 212. That is, the mass flow sensor 230 is connected to the first passage 212 at a location between the inlet portion 214 of the base 210 and the second passage 218. The mass flow sensor 230 includes a sampling pipe 232, first and second thermal resistances 234a and 234b coiled around the sampling pipe 232, respectively, a bridge circuit 236 connected to the first thermal resistances 234a and the second thermal resistances 234b, an amplifier 238 connected to the bridge circuit 236 and a compensator 240 connected to the amplifier 238.

Also, a bypass 220 is disposed in the passage 212 between the inlet portion 214 of the base 210 and the first upstream portion 212a of the passage. The sampling pipe 232 is branched from the first passage 212 at a location adjacent an inlet of the bypass 220. The sampling pipe 132 connects back to the first passage 212 adjacent an outlet of the bypass 220. The bypass 220 may be of a capillary type that creates a laminar flow of the fluid passing therethrough.

The first thermal resistance 234a is wound on an upstream end of the sampling pipe 232 and the second thermal resistance 234b is wound on a downstream end of the sampling pipe 232. When the first thermal resistance 234a and the second thermal resistance 234b are heated, the bridge circuit 236 generates an electric signal corresponding to a temperature difference between the upstream and downstream ends of the sampling pipe 232.

The amplifier 238 amplifies the electric signal detected by the bridge circuit 236. The compensator 240 correlates the amplified electric signal to the mass flow of the fluid passing through the bypass portion 220.

The first valve 250 includes a first valve body 252, a first driving unit 254 and a first valve seat 258. A first port 222 is provided at an upper portion of the base 210 adjacent to the outlet portion 216. The first valve 250 is connected to a first connecting member 256 mounted to the base 210 in the first port 222. The first valve seat 258 is mounted in an inlet of the first port 222. The first passage 212 extends from the inlet portion 214 to the outlet portion 216 of the base 210 via the first port 222. More particularly, the first port 222 is connected to the first passage 212 between the first and second portions 212a and 212b of the first passage 212. The fluid passes from the first portion 212a of the first passage 212 through the inlet and outlet portions of the first port 222. The arrows in FIG. 4 represent the direction in which the fluid passes through the first port 222 when the first valve 250 is open.

The first valve body 252 includes a first valve head 252a in the form of a disk, and a first connecting shaft 252b.

Alternatively, the first valve head 252a may be a poppet valve head, i.e., may be in the form a cone. The first driving unit 254 adjusts the position of the first valve body 252 to control the flow of the fluid through the first port 222, i.e., through the passage 212. The first driving unit 254 may include a solenoid.

The first valve 250 may have other configurations depending upon the kind of the driving unit employed. For example, the first valve 250 may be a thermal valve including a thermal type of driving unit or may be a piezoelectric valve having a piezoelectric stack composed of a plurality of piezoelectric elements.

The valve controller 260 controls the operations of the first valve 250 and the second valve 270. The valve controller 260 receives a signal from the compensator 240. On the basis of this signal, the valve controller 260 controls the first valve 250 such that the mass flow measured by the mass flow sensor 230 corresponds to the predetermined standard flow. While the first valve 250 is open, the second valve 250 is controlled to be closed. Separate control mechanisms may be provided for respectively controlling the operation of the first valve 250, and the operation of the second valve 270.

The second valve 270 includes a second valve body 272, a second driving unit 274 and a second valve seat 278. A second port 224 is provided at a lower portion of the base 210 adjacent to the outlet portion 216. The second passage 218 is connected between the first and second portions 212a and 212b of the first passage 212 via the second port 224. The second valve 270 is connected a second connecting member 276 mounted to the base 210 in the second port 224. The second valve seat 278 is mounted to the second connecting member 276 at an inlet of the second port 224.

The second valve 270 is normally closed. When the first valve 250 is closed during an abnormal operation of the mass flow controller 200, the second valve 270 is opened to exhaust fluid remaining in the first passage 212. Specifically, the fluid remaining in the first passage 212 is exhausted through the first and second portions 212a, 212b of the first passage 212 via the second port 224.

The second valve body 272 includes a second valve head 272a in the form of a disk or cone, and a second connecting shaft 272b. The second driving unit 274 is operatively connected to the valve controller 260 to receive a signal that controls the position of the second valve head 272a relative to the second valve seat 278. To this end, the second driving unit 274 may include a solenoid. However, again, the configuration of the second valve 270 may differ depending upon the kind of driving unit employed. For example, the second valve 270 may be a thermal valve including a thermal type of driving unit or may be a piezoelectric valve having a piezoelectric stack composed of a plurality of piezoelectric elements.

Figure 5:
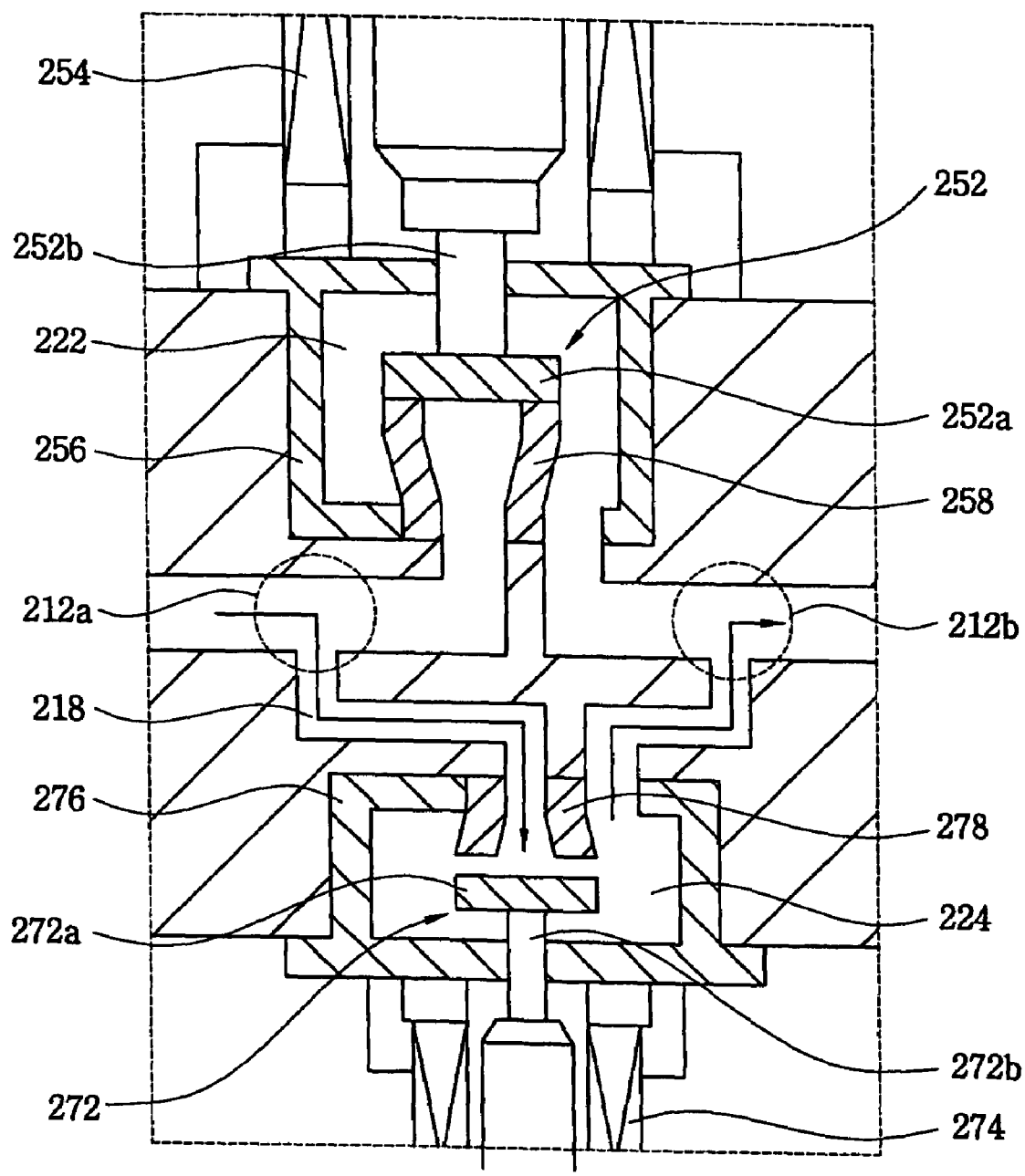
FIG. 5 is a similar view but showing the second valve in an opened state.

Referring now to FIG. 5, the mass flow sensor 230 generates an abnormal signal when the mass flow controller 200 is in trouble.

The abnormal signal results in the valve controller 260 closing the first valve 250. An air valve (not shown) mounted on the fluid supply pipe that is connected between a fluid source (not shown) and the mass flow controller 200 is then closed. The first valve 250 or the second valve 270 is then opened by a signal from the valve controller 260 to purge the fluid remaining in the fluid supply pipe and the mass flow controller 200. Accordingly, the fluid remaining in the fluid supply pipe and the mass flow controller 200 is exhausted through the first valve 250 or the second valve 270.

When the valve controller 260 is experiencing trouble, i.e., when the valve controller 260 fails to output a signal, the first valve 250 closes the first passage 212 because current is not supplied to the first valve 250. The air valve disposed between the fluid source and the mass flow controller 200 is then closed. The second valve 270 is opened to open the second passage 218. Accordingly, the fluid remaining in the fluid supply pipe and the mass flow controller 200 is exhausted through the second passage 218. Likewise, when the first valve 250 is abnormally closed even though an open signal is input thereto by the valve controller 260, the air valve disposed between the fluid source and the mass flow controller 200 is closed and the second valve 270 is opened to exhaust. the fluid remaining in the fluid supply pipe and the mass flow controller 200 through the second passage 218.

Figure 6:
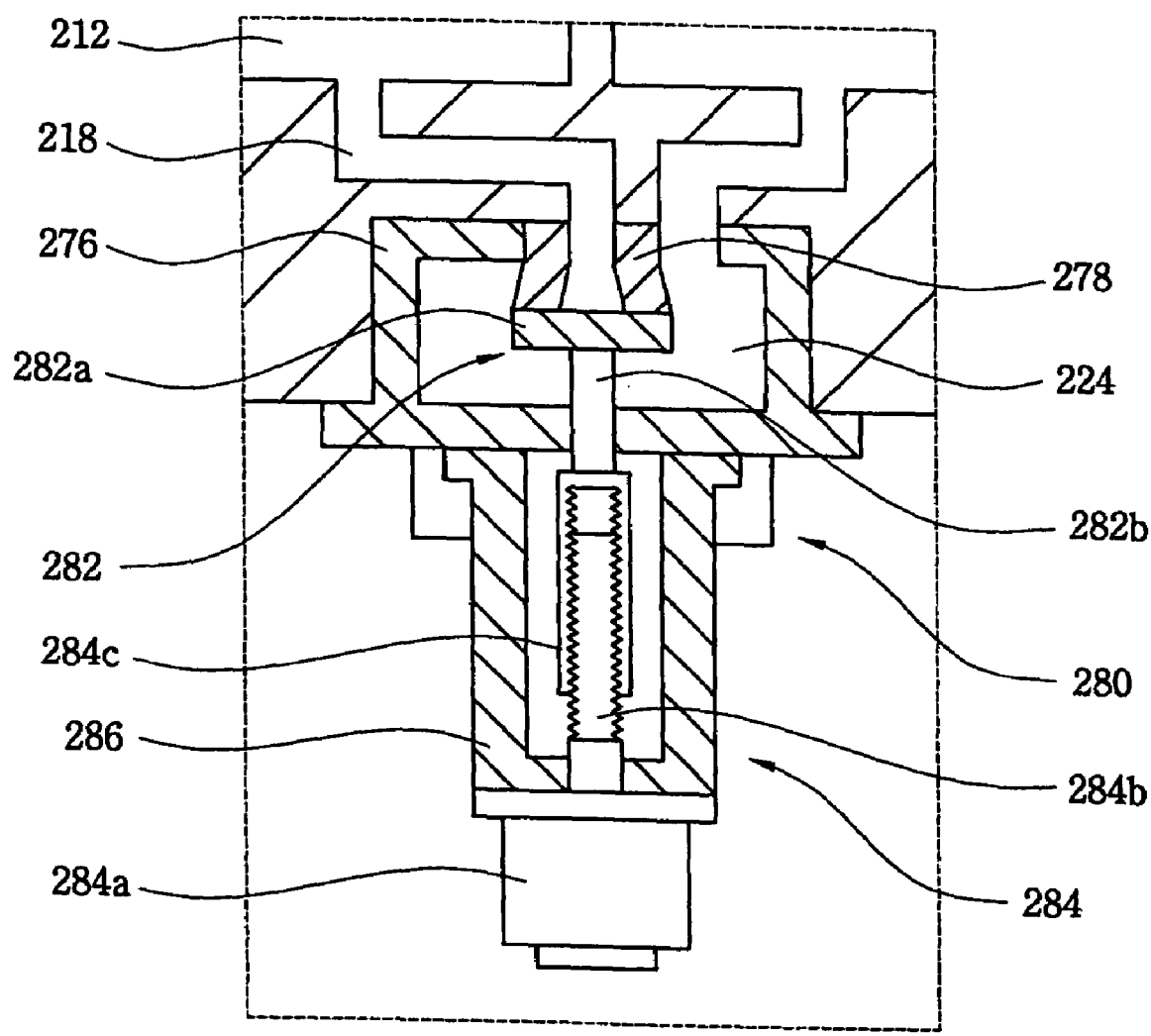
FIG. 6 is an enlarged view of a second valve of another embodiment of the mass flow controller according to the present invention.

FIG. 6 shows another embodiment of a second valve in accordance with the present invention.

Referring to FIG. 6, this second valve 280 includes a second valve body 282 for blocking the second passage 218 and a second driving unit 284 for moving the second valve body 282. The second valve body 282 includes a second valve head 282a and a second connecting shaft 282b. The second driving unit 284 includes a motor 284a, a driving screw 284b connected to the motor 284a, a driven screw 284c connecting the driving screw 284b to the second valve body 282, and a housing 286.

The motor 284a transmits a driving force to the second valve body 282. In this respect, the motor 284a may be a stepper motor capable of controlling the rotation of the driving screw 284b. The rotation of the driving screw 284b is transmitted to the driven screw 284c to move the driven screw 284c and hence, the second valve body 282, linearly.

Alternatively, the second valve may be manually operated. In this case, the second valve may still comprise the second valve body 282, the driving screw 284b and the driven screw 284c. The second valve body 282 may be moved linearly by manually rotating the driving screw to open/close the second passage 218.

Figure 7:
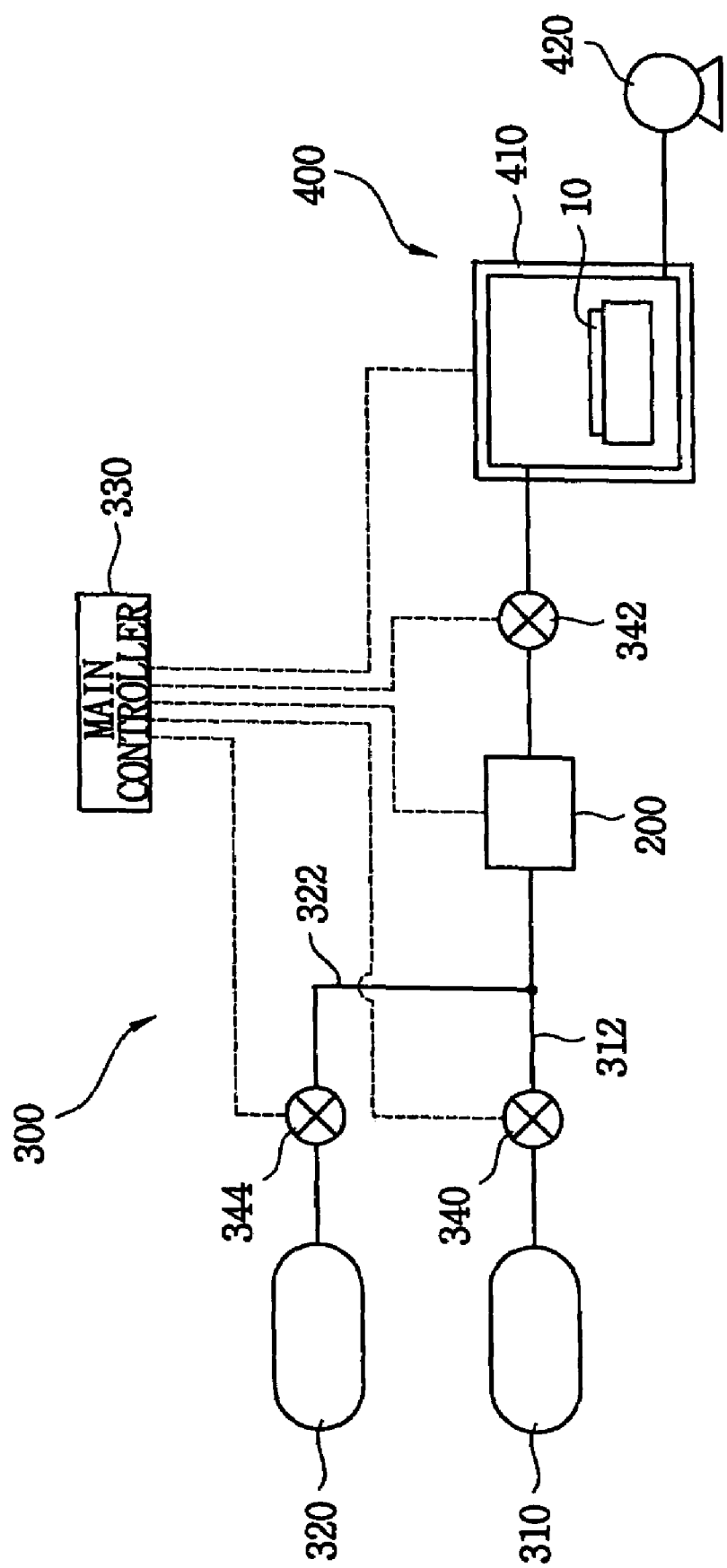
FIG. 7 is a schematic diagram of semiconductor device fabricating equipment comprising a gas supplying apparatus having the mass flow controller of FIG. 3.
Figure 8:
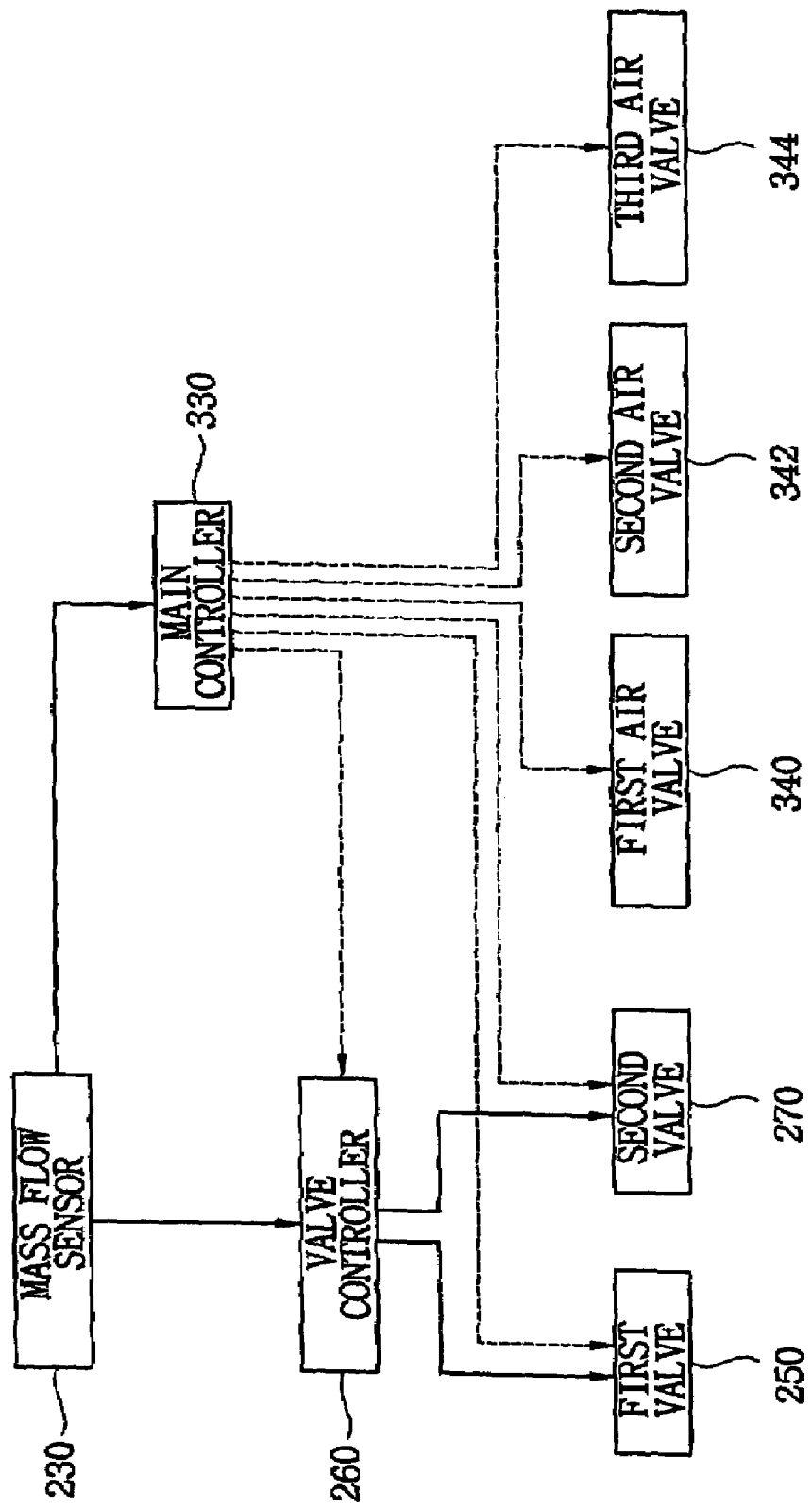
FIG. 8 is a block diagram of the gas supplying apparatus of FIG. 7.

FIG. 7 is a schematic diagram of a gas supplying apparatus having the mass flow controller shown in FIG. 3. FIG. 8 is a block diagram of the gas supplying apparatus.

Referring to FIGS. 7 and 8, a gas supplying apparatus 300 is used for providing gas to a semiconductor processing apparatus 400 in which a substrate 100 is disposed. The gate supplying apparatus 300 includes a processing gas source 310, a processing gas line 312, a mass flow controller 200, a purge gas source 320, a purge gas line 322, a main controller 330 and first, second and third air valves 340, 342 and 344.

The processing gas source 310 is connected to a processing chamber 410, in which the substrate 10 is processed, via the processing gas line 312. The first air valve 340, the mass flow controller 200 and the second air valve 342 are disposed in series in the processing gas line 312. The substrate 10 is processed using the processing gas that is introduced into the processing chamber 410 from the processing gas source 310. A vacuum pump 420 is connected to the processing chamber 410. The vacuum pump 420 exhausts processing gas and a byproduct of the process from the processing chamber 410.

The purge gas line 322 connects the purge gas source 320 to the processing gas line 312 at a location between the first air valve 340 and the mass flow controller 200. The purge gas may be an inert gas such as a nitrogen or argon. The third air valve 344 is disposed in the purge gas line 322.

The main controller 330 is connected to the air valves 340, 342 and 344 and the mass flow controller 200. The main controller 330 controls the flow of the processing gas. Furthermore, the main controller 330 controls the processing of the substrate 10.

When the mass flow controller 200 experiences trouble during the process, the main controller 330 closes the first and second air valves 340 and 342 to stop the process. The substrate 10 is then unloaded from the processing chamber 410. The processing gas remaining in the processing gas line 312 and the mass flow controller 200 is exhausted.

More specifically, if the mass flow controller 200 is operating abnormally and the mass flow sensor 230 generates a signal that is outside a normal operational range, the abnormal signal is transmitted to the main controller 330. Consequently, the main controller closes the first and second air valves 340 and 342 and the mass flow controller 200. Thus, the supplying of the processing gas to the processing chamber 410 is suspended. Once the substrate 10 is unloaded from the processing chamber 410, the main controller 330 opens the second air valve 342 and the first valve 250 or the second valve 270 to exhaust the processing gas remaining in the processing gas line 312 and the mass flow controller 200. In this case, the main controller 330 may generate a signal that directly opens the first valve 250 or the second valve 270. Alternatively, the main controller 330 may command the valve controller 260 to open the first valve 250 or the second valve 270. The main controller 330 then opens the third air valve 344 to purge the processing gas line 312, the mass flow controller 200 and the processing chamber 410. After the processing gas line 312, the mass flow controller 200 and the processing chamber 410 are purged, the main controller 330 closes the second and third air valves 342 and 344. The defective mass flow controller 200 is then replaced.

For instance, the first valve 250 might become closed when the valve controller 260 is operating improperly. In this case, the mass flow sensor 230 detects the abnormally closed state of the first valve 250 by generating a signal indicative of a lack of flow of gas through the passage 212. The signal is transmitted to the main controller 330 which closes the first and second air valves 340 and 342 as a result. The substrate 10 is then unloaded from the processing chamber 410. next, the main controller 330 opens the second air valve 342 and the second valve 270 to exhaust the fluid remaining in the processing gas line 312 and the mass flow controller 200.

On the other hand, the first valve 250 may merely malfunction. If this occurs, the mass flow sensor 230 generates a signal indicative of the malfunctioning of the first valve 250. The main controller 330 receives the signal and, as a result, cuts off the current to the first valve 250 and closes the first and second air valves 340 and 342. Next, the substrate 10 is unloaded from the processing chamber 410, and the main controller 330 opens the second air valve 342 and the second valve 270. The main controller 330 may also directly open the first valve 250 to exhaust the fluid remaining in the processing gas line 312 and the mass flow controller 200.

Still further, the first valve 250 may close due to a failure of the first valve 250, whereby, the first passage 212 (see FIG. 3) is blocked. At this time, the mass flow sensor 230 generates a signal indicative of the first passage 212 being blocked. The main controller 330 receives the signal and, as a result, closes the first and second air valves 340 and 342. The substrate 10 is then unloaded from the processing chamber 410. Then, the main controller 330 opens the second air valve 342 and the second valve 270 to exhaust the fluid remaining in the processing gas line 312 and the mass flow controller 200.

According to the present invention, as described above, a purge line and a purge valve are not needed when the first valve of the mass flow controller is operating/operated abnormally. Therefore, the volume and cost of a gas supplying apparatus in which the mass flow controller is employed can be kept to a minimum.

Finally, modifications of and variations in the preferred embodiments of the present invention will become obvious to persons skilled in the art in light of the above teachings. Therefore, the present invention is not limited to the preferred embodiments described above. Rather, the true spirit and scope of the inventions defined by the appended claims.

What is claimed is:

1. Substrate processing equipment comprising:

a processing chamber in which a substrate is processed;

a source of processing gas;

a gas line connecting the source of processing gas to the processing chamber such that gas from the source is supplied to the processing chamber;

a mass flow controller disposed in the gas line so as to control the mass flow of the gas passing through the gas line, wherein the mass flow controller comprises a base having a first passage therein, an inlet portion having an opening connected to the first passage and to the gas line so that gas can be introduced to the first passage from the gas line through the opening, an outlet portion having an opening connected to the first passage and to the gas line so that gas flowing through the first passage can be released back to the gas line, and a second passage branched from a first portion of the first passage and connected to a second portion of the first passage, the first portion being disposed upstream of the second portion with respect to the direction of a flow of gas from the inlet portion to the output portion via the first passage, a mass flow sensor connected to the first passage between the inlet portion of the base and the first portion of the passage, the mass flow sensor being operative to measure the mass flow of the gas passing through the first passage, a first valve disposed in-line in the first passage between the first and second portions of the first passage, and operative to control the first valve such that the mass flow of gas passing through first passage;

a second valve disposed in-line in the second passage and operative to selectively open and close the second passage, the second valve comprising a valve body that is movable between first and second positions to open and close the second passage, respectively, and a driving unit operatively connected to the valve body to drive the valve body between the first and second positions, and a valve controller operatively connected to the mass flow sensor and to the first valve, and operative to compare the mass flow measured by the mass flow sensor to a standard flow and to control the first valve such that the mass flow of gas in the first passage corresponds to the standard flow; and a main controller operatively connected to the driving unit of the second valve of the mass flow controller so as to control the operation of the second valve.

2. The substrate processing equipment of claim 1, wherein the main controller is operatively connected to the mass flow sensor so as to control the operation of the second valve on the basis of signals generated by the mass flow sensor.

3. The substrate processing equipment of claim 2, wherein the main controller is operatively connected to the first valve independently of the valve controller of the mass flow controller.

4. The substrate processing equipment of claim 1, further comprising a source of purge gas connected to the processing chamber via the mass flow controller.

* * * * *